3,266,912
METHOD AND COMPOSITION FOR DECORATING GLASS-CERAMICS
Peter J. Murphy, Belleville, N.J., assignor to Engelhard Industries, Inc., Newark, N.J., a corporation of Delaware
No drawing. Filed Mar. 29, 1961, Ser. No. 99,046
8 Claims. (Cl. 106—1)

This invention relates to a new and improved method for decorating glass-ceramics and to novel precious metal decorating compositions forming decorative films of high thermal stability.

Glass-ceramics are ceramic bodies consisting essentially of interlocked inorganic micro-crystals dispersed in a glassy matrix, the matrix consisting essentially of the uncrystallized portions of the glass. They are produced by the controlled crystallization of a heteronucleated glass, the crystallization being continued until a product is obtained that is at least fifty percent crystalline. They differ from glass in which uncontrolled or accidential crystallization has occurred, and in which the crystals are relatively coarse and nonuniform, and from opal glasses which contain relatively small amounts of crystals initiated by homogeneous nucleation, and they resemble ceramics rather than glass in their properties although differing from conventional ceramics such as porcelain and china which contain voids and are nonuniform in character. Glass-ceramics have been described in detail by S. D. Stookey in U.S. Patent No. 2,920,971, and in "Industrial and Engineering Chemistry," volume 51, pages 805–8, July 1959. They are also described in an article, "The Corning Story" in the October 1959 issue of "Ceramic Age," pages C–1 to C–86, particularly pages C–71 to C–75, and in various technical bulletins published by Corning Glass Works, Corning, New York. Glass-ceramics are also known by the trademark "Pyroceram," and commercially available materials are known by code numbers referring to particular types of glass-ceramics having carefully controlled properties. Thus, for example, the term "Pyroceram 9608" refers to a particular glass-ceramic described in the cited article in "Industrial and Engineering Chemistry."

The conversion of a glass containing a nucleating agent into a glass-ceramic is accomplished by a carefully controlled heating cycle, first holding the glass at a temperature favorable to the formation of nuclei and then, after slow heating, at a temperature favorable to crystal growth until the desired degree of crystallization has been attained. Alternatively, in the case of photosensitive nucleating agents, the glass may be exposed to short-wave radiations to promote the formation of nuclei followed by controlled heating to promote crystal growth. The process of controlled crystal growth is known as ceraming, and the finished product is said to have been ceramed. Before any material degree of crystallization has occurred, such a glass is described as being in a glassy or unceramed state. Such glasses in the glassy state can be shaped by the usual techniques of shaping and forming glass, such as blowing, drawing, pressing and casting. This is impossible with the glass-ceramic in the finished ceramed state, so that articles and ware receive substantially their final shape while the glass is in the glassy state and before ceraming.

Generally speaking, glass-ceramics can not be decorated with conventional ceramic colors or glass enamels, probably due to differences in the coefficients of thermal expansion of the glass-ceramic and the ceramic color or glass enamel. Glass-ceramics can be decorated with conventional liquid bright precious metal decorating compositions. Such decorations have certain thermal limitations, however, limiting the utility of the decorated articles and increasing the cost and labor required to decorate such articles. It is an object of this invention to provide methods and compositions not subject to this limitation.

As "liquid bright gold," precious metal decorating compositions have been known for many years. In an article by Boudnikoff, Comp. rend. 196, 1898–9 (1933), a method is described for making a gold compound from sulfurized Venetian turpentine. The gold compound made in this way is referred to in the art as gold resinate. This gold compound is dissolved in essential oils, such as oil of lavender, oil of rosemary and aniseseed oil, and when gold fluxes, such as rhodium resinate, bismuth resinate and chromium resinate have been added to the solution in their proper proportions, a decorating composition known as "liquid bright gold" results.

Another type of gold resinate used in making liquid bright gold is described in U.S. Patent 2,490,399, granted to H. K. Ballard. This type of gold resinate is referred to as a terpene mercaptan gold resinate or simply as gold terpene mercaptide. Still another class of liquid bright golds contains gold teritary alkyl mercaptides as described in copending application, Serial No. 727,254, filed April 9, 1958, and now Patent No. 2,984,575.

Decorating compositions containing platinum for use on glass and ceramics are known in the art and have been described by Chemnitius, Sprechsaal 60, 226 (1927); C.A. 24, 4909. Such compositions contain a platinum resinate prepared by causing a platinum salt to react with a sulfurized terpene such as sulfurized Venetian turpentine. The platinum resinate is dissolved in vehicles such as oils of lavender, rosemary, aniseseed, sassafras, wintergreen and fennel, turpentine, various terpenes, nitrobenzene and the like and is mixed with fluxes such as salts and resinates of rhodium, chromium, bismuth, lead, cadmium, tin, copper, cobalt, antimony and uranium and with resins such as Assyrian asphalt and various rosins to form decorating compositions. Such compositions are known as liquid bright platinums. Other liquid bright platinums containing halogeno-platinous mercaptide-alkyl sulfide complexes are described in U.S. Patent 3,022,177.

It is well known in the art that a palladium compound may be prepared in the same manner as the above-mentioned platinum resinate. Decorating compositions made from a palladium resinate are known as liquid bright palladiums. Other liquid bright palladiums containing bisthioether palladous salt coordination compounds are described in copending U.S. patent application 60,575, filed October 5, 1960, and now Patent No. 3,216,834.

Precious metal decorating compositions are applied by brushing, stamping, spraying, screen-printing, offset printing or other techniques to refractory substrates such as glass, quartz, glazed ceramics, unglazed ceramics, Pyroceram, mica, stainless steel, aluminum and titanium. Upon firing the refractory substrates in the range of 400° C. to 900° C., adherent precious metal films result. These films are useful for their decorative appeal, for their ability to conduct electricity, to transmit particular wavelengths of ultraviolet and visible light, to reflect infrared and other energy, as bases for soldering and for other purposes. The peak temperature at which a particular substrate is fired is determined by the chemical and physical composition of the substrate; e.g., soda-lime glass starts to deform when heated much in excess of 600° C. while fused silica can be heated above 1200° C. without deformation. However, even on the more refractory substrates such as fused silica and unglazed ceramics, it is well known that the thin precious metal films, formed from the decorating compositions of the prior art, deteriorate when heated at approximately 900 to 1000° C. for periods of 30 minutes or longer. This deterioration takes the form of loss of adherence, lack of electrical conductivity and decrease in decorative appeal. Under magnification it can be seen that this extreme heat has caused the precious metal films to change from smooth, continuous films to non-continuous groups of discrete particles. Since 900 to 1000° C. is below the melting point of gold (1063° C.), palladium (1549° C.) and platinum (1773° C.), it is assumed that thin films of these metals fail in this temperature range due to some surface phenomenon.

An outstanding advantage of glass-ceramics is their high thermal stability compared to ordinary glasses. While the softening point varies with the nature of the glass-ceramic, the softening points are of the order of 900 to 1350° C., which is far above the softening point of soda-lime (ca. 700° C.) or even borosilicate glass (ca. 820° C.). Moreover, the glass-ceramics have excellent dielectric properties, which are maintained to high temperatures. They are thus very desirable substrates for precious metal films for electrical and reflective uses at high operating temperatures, and the failure of precious metal films obtained from conventional liquid bright precious metal decorating compositions to withstand high temperatures is a distinct disadvantage. A further disadvantage stems from the high temperatures of the ceraming cycle. Typically, the glass-ceramics are held at temperatures of the order of 900 to 1350° C. for periods ranging from one-half hour to several hours to complete the ceraming process. It has thus not been possible to obtain precious metal films on glass-ceramics by applying a conventional liquid bright precious metal decorating composition to a glass-ceramic article in the glassy state and firing the film and ceraming the article in a single firing. All attempts to accomplish this have resulted in thin, non-specular, non-adherent films having no practical value or in the formation of no discernible film whatever. To obtain useful precious metal films, it has been necessary to decorate glass-ceramic articles after ceraming and to subject the articles to a further decorating fire, materially increasing the cost, equipment and labor required to produce a decorated glass-ceramic article as compared to the same article without decoration.

As may be seen from the foregoing discussion of liquid bright precious metal decorating compositions, such compositions comprise organic precious metal compounds, fluxes and organic vehicles. The total number of moles of fluxing elements in such compositions is of the order of 0.02 to 0.08 mole per mole of precious metal in the composition. The majority of such compositions contain about 0.05 mole of fluxing elements per mole of precious metal, and a substantially higher proportion of fluxing elements adversely affects the metal film obtained from the composition on firing, causing it to be duller, less conductive and generally inferior to films obtained from compositions containing 0.05, or less, mole fluxing elements per mole of precious metal. In accordance with this invention, it has been found that films capable of withstanding the rigorous conditions of the ceraming cycle can be obtained with precious metal decorating compositions containing a total of about 0.25 to 10 moles, and preferably from about 0.5 to 3 moles, of fluxing elements per mole of precious metal. This is a major advantage in that it permits the production of decorated glass-ceramic articles from glass-ceramic articles in the glassy state in a single firing, avoiding the equipment and labor that would otherwise be needed for a second decorating firing. Moreover, the films obtained are bright, specular, adherent and highly decorative. The reason for this is not known at the present time, and it is possible that the fluxing elements function in the ceraming cycle by a mechanism different from their usual fluxing action at conventional firing temperatures on conventional substrates.

Suitable fluxing elements and molar proportions for use in precious metal decorating compositions capable of forming decorative films in the ceraming cycle are listed in Table I. The molar proportions listed are not necessarily optimal but represent proportions that have been found to give useful decorative films on glass-ceramics under ceraming conditions. In each case, the fluxing element listed was the sole fluxing element in the composition. It is frequently desirable to use mixtures of fluxing elements and/or more than one precious metal in a decorating composition. This may be done so long as the proportion of the total moles of fluxing elements combined to the total moles of precious metals combined falls within the previously stated limits.

TABLE I.—SUITABLE FLUXING ELEMENTS AND MOLAR PROPORTIONS

| Fluxing element: | Moles fluxing element per mole precious metal |
|---|---|
| Aluminum | 1 |
| Antimony | 0.5 |
| Barium | 1 |
| Bismuth | 0.67 |
| Boron | 1 |
| Cadmium | 1 |
| Calcium | 1 |
| Cerium | 0.5 |
| Chromium | 1 |
| Cobalt | 3 |
| Copper | 2 |
| Gallium | 0.67 |
| Germanium | 1 |
| Indium | 0.67 |
| Iron | 2 |
| Lanthanum | 1 |
| Lead | 1 |
| Lithium | 1 |
| Magnesium | 1 |
| Manganese | 3 |
| Molybdenum | 0.33 |
| Neodymium | 0.67 |
| Nickel | 1 |
| Niobium | 2 |
| Phosphorus | 1 |
| Potassium | 1 |
| Praseodymium | 0.5 |
| Rhenium | 0.67 |
| Silicon | 0.5 |
| Sodium | 1 |
| Strontium | 1 |
| Tantalum | 0.29 |
| Tin | 1 |
| Titanium | 1 |
| Tungsten | 0.5 |
| Uranium | 3 |
| Vanadium | 1 |
| Yttrium | 0.67 |
| Zinc | 1 |
| Zirconium | 1 |

The fluxing elements are, of course, not employed in their elemental form but in the form of chemical compounds. It is highly desirable and preferable that the compounds be soluble in the organic vehicles used in precious metal decorating compositions, and organic compounds and salts of fluxing elements are preferred. Suitable compounds include resinates, sulforesinates, salts of acids, such as stearic and naphthenic acids, alcoholates or esters, and the like. The exact nature of the compound does not appear to be critical, so long as the desired solubility is achieved, and non-fluxing elements such as carbon, hydrogen, sulfur, nitrogen and halogens present in such compounds are presumed to burn off during the firing. The methods of making suitable compounds of fluxing elements are well known to those skilled in the art of preparing decorating compositions.

rating compositions to glass-ceramics in the glassy state and ceraming the articles. In all cases the films were adherent and specular and the colors were bright and attractive.

TABLE II.—COLORS OF FILMS OBTAINED FROM REPRESENTATIVE PRECIOUS METAL DECORATING COMPOSITIONS

| Color of Film | Percent Precious Metal in Composition | Molar Proportion of Elements in Composition |||||||||||||  Moles Fluxing Elements per Mole of Precious Metal |
|---|---|---|---|---|---|---|---|---|---|---|---|---|---|---|---|
| | | Au | Pt | Pd | Ta | Nb | Si | U | Co | Fe | Ti | Zn | V | Ca | |
| Golden | 12.0 | 1.00 | | | | 0.37 | | | 0.21 | | | | | | 0.58 |
| Golden | 14.1 | 1.00 | | | | 0.33 | | | 0.19 | | | | | | 0.52 |
| Golden | 15.2 | 1.00 | | | | | | 0.09 | | | | | | 0.17 | 0.26 |
| Silvery | 10.3 | | 1.00 | | 0.30 | | | | 0.14 | | | | | | 0.44 |
| Coppery | 9.4 | 1.00 | | | | | | 1.00 | | | | | | | 1.00 |
| Red | 4.9 | 1.00 | | | 0.55 | | | 2.00 | | | | | | | 2.55 |
| Blue | 2.4 | 1.00 | | | 0.55 | | | | 0.88 | | | | | | 1.43 |
| Blue | 4.8 | 1.00 | | | 0.56 | | | | 0.44 | | | | | | 1.00 |
| Gray-Blue | 5.5 | 1.00 | | | 1.96 | | | 1.00 | | | | | | | 2.96 |
| Bronze | 4.8 | 1.00 | | | 0.56 | | | | | | | | 1.46 | | 2.02 |
| Green | 4.8 | 1.00 | | | 0.56 | | | | | | | 1.58 | | | 2.14 |
| Violet | 2.0 | 1.00 | | | 0.90 | | 3.48 | | | | 1.33 | | | 0.74 | 6.45 |
| Brown | 4.8 | 1.00 | | | 0.56 | | | 0.15 | | | | | | | 0.71 |
| Brown | 5.3 | 1.00 | | | | | 3.00 | | | | | | | 0.67 | 3.67 |
| Brown | 6.7 | 1.00 | | | | | 4.90 | | | | | | | 0.88 | 5.78 |
| Gray | 11.0 | 1.00 | | | 0.89 | | | | 0.51 | | | | | | 1.40 |
| Gray | 0.9 | | | 1.00 | 1.60 | | | | | 4.48 | | | | | 6.08 |
| Gray-Black | 5.6 | 1.00 | | 1.42 | 1.12 | | 0.34 | | | 2.17 | | | | | 1.50 |
| Black | 8.6 | 1.00 | | 0.72 | 0.56 | | 0.34 | | | 1.10 | | | | | 1.16 |
| Black | 10.3 | 1.00 | 0.20 | | | | | | | | | 1.95 | | | 1.63 |

The organic vehicles for precious metal decorating compositions are chosen with regard to the method by which the composition is to be applied and vary with different methods of application. They may be mixtures of simple solvents, but they will usually include mixtures of essential oils, terpenes, resins, and the like, carefully chosen to impart specific physical properties to the composition. These properties, such as oiliness, viscosity, evaporation rate, surface tension and tack will vary for different methods of application such as brushing, spraying, stippling, stamping, printing, both direct and offset, hot or cold screen printing, stenciling, decalcomania, and the like. Typical vehicles include mixtures of two or more of the following ingredients: methyl ethyl ketone, cyclohexanone, ethyl acetate, amyl acetate, Cellosolve, butanol, nitrobenzene, toluene, xylene, petroleum ether, chloroform, carbon tetrachloride, various terpenes, such as pinene, dipentene and the like, essential oils, such as oils of lavender, rosemary, aniseseed, sassafras, wintergreen, fennel and turpentine, Assyrian asphalt, various rosins and balsams, and synthetic resins.

It may be noted that glass-ceramics can be decorated and ceramed in a single firing operation by using a type of decorating composition known as a stain. Stains are suspensions of inorganic oxides or salts in inorganic or organic vehicles. When applied to glass-ceramics in the glassy state followed by ceraming, the substrate is colored by penetration of ions from the stain into the substrate. In this application, stains have the following disadvantages:

(1) The range of colors is very limited.
(2) The colors are matte.
(3) None of the stains is electrically conductive.

The precious metal decorating compositions of this invention differ from stains in that the latter do not contain organic precious metal compounds nor are they solutions but rather suspensions of inorganic solids. On glass-ceramics, the films formed from the precious metal decorating compositions of this invention have the following advantages:

(1) A wide range of colors.
(2) The colors are bright, intense and specular.
(3) Certain compositions are electrically conducting.

Table II is illustrative of the wide range of colors of the films obtained on glass-ceramics in accordance with this invention by applying various precious metal deco- Of the fluxing elements for liquid bright precious metal decorating compositions, tantalum and niobium are particularly preferred as giving brilliant, specular, adherent films in a wide range of intense colors depending upon the proportion of tantalum or niobium to precious metal and the nature of the precious metal. The films obtained may be developed on glass-ceramics during the ceraming cycle and are resistant to temperatures as high as 1350° C. They are also thermally stable on other highly refractory substrates such as unglazed ceramics and fused silica. Tantalum or niobium may be employed as the sole fluxing agent in precious metal decorating compositions or in conjunction with other fluxing elements such as cobalt, iron, silicon, titanium, bismuth, chromium, zinc, uranium and rhodium. Suitable soluble compounds of tantalum and niobium for use in precious metal decorating compositions include chlorides and, preferably, resinates and alcoholates.

The effect of adding tantalum, to a conventional gold decorating composition, on the film formed on glass-ceramics in the ceraming cycle may be seen from the following experiment. Four compositions were prepared as follows:

*Composition A.*—A mixture of the following ingredients was prepared, giving the gold decorating composition described in Example X of U.S. Patent 2,984,575.

Ingredient: Parts by weight
Gold tert.-dodecyl mercaptide dissolved in cyclohexanone (35% Au) _____ 286
Rhodium resinate dissolved in a mixture of essential oils and hydrocarbons (1% Rh) __ 50
Bismuth resinate dissolved in a mixture of essential oils (4.5% Bi) _____ 70
Chromium resinate dissolved in a mixture of cyclohexanone and oil of turpentine (2.05% Cr) _____ 20
Asphalt dissolved in oil of turpentine (30% Asphalt) _____ 200
Rosin dissolved in oil of turpentine (50% rosin) _____ 200
Chloroform _____ 100
Nitrobenzene _____ 70
Oil soluble red dye _____ 4

Total _____ 1,000

The clear, dark red solution thus obtained contained 10 percent gold, and as fluxing elements 0.05 percent rhodium, 0.32 percent bismuth and 0.04 percent chromium. Per mole of gold, the solution contained 0.0096 mole of rhodium, 0.0302 mole of bismuth and 0.0152 mole of chromium, giving a total of 0.0550 mole of fluxing elements per mole of gold.

*Composition B.*—9.83 parts by weight of Composition A was mixed with 0.17 part by weight of tantalum alcoholate dissolved in a mixture of hydrocarbons (24.6% Ta). The resulting solution contained 0.0454 mole of tantalum per mole of gold, the ratio of the other fluxing elements remaining the same, giving a total of 0.1004 mole of fluxing elements per mole of gold.

*Composition C.*—9.66 parts by weight of Composition A was mixed with 0.34 part by weight of tantalum alcoholate dissolved in a mixture of hydrocarbons (24.6% Ta). The resulting solution contained 0.0924 mole of tantalum per mole of gold, the ratio of the other fluxing elements remaining the same, giving a total of 0.1473 mole of fluxing elements per mole of gold.

*Composition D.*—9.00 parts by weight of Composition A was mixed with 1.00 part by weight of tantalum alcoholate dissolved in a mixture of hydrocarbons (24.6% Ta). The resulting solution contained 0.2972 mole of tantalum per mole of gold, the ratio of the other fluxing elements remaining the same, giving a total of 0.3522 mole of fluxing elements per mole of gold.

The four compositions were brushed in consecutive bands on a glass-ceramic dish in the glassy state, the dish was ceramed by slowly heating to 1120° C. and holding at this temperature for one-half hour followed by slow cooling, and the films obtained were examined. Composition A gave a thin, very pale brown, matte film that was easily removed by gentle rubbing with the tip of a finger. Composition B gave a pale brown, matte film that was easily removed by rubbing. Composition C gave a chocolate brown, semi-matte film that could be removed by rubbing. Composition D gave a beautiful bright, specular, dark copper colored film with a golden sheen that could not be removed by rubbing or even by hard scratching with the finger nail.

In a similar manner, the following compositions containing niobium were prepared and tested.

*Composition E.*—9.80 parts by weight of Composition A were mixed with 0.20 part by weight of niobium alcoholate dissolved in a mixture of hydrocarbons (17.29% Nb). The resulting solution contained 0.0748 mole of niobium per mole of gold, the ratio of the other fluxing elements remaining the same, giving a total of 0.1298 mole of fluxing elements per mole of gold.

*Composition F.*—9.60 parts by weight of Composition A were mixed with 0.20 part by weight of niobium alcoholate dissolved in a mixture of hydrocarbon (17.29% Nb). The resulting solution contained 0.1527 mole niobium per mole of gold, the ratio of the other fluxing elements remaining the same, giving a total of 0.2077 mole of fluxing elements per mole of gold.

*Composition G.*—8.80 parts by weight of Composition A were mixed with 1.20 parts by weight of niobium alcoholate dissolved in a mixture of hydrocarbons (17.29% Nb). The resulting solution contained 0.4999 mole of niobium per mole of gold, the ratio of the other fluxing elements remaining the same, giving a total of 0.5549 mole of fluxing elements per mole of gold.

When applied to a glass-ceramic in the glassy state and ceramed as before, the adherence and appearance of the films obtained from Compositions E, F and G were generally the same as was obtained with B, C and D, respectively, the colors being somewhat lighter in shade and more golden with E, F and G.

The invention will be further illustrated by reference to the following specific examples:

*Example 1*

A precious metal decorating composition suitable for brushing was prepared by mixing together the following ingredients.

| Ingredient: | Parts by weight |
|---|---|
| Gold tertiary dodecyl mercaptide dissolved in heptane (30% Au) | 4.00 |
| Niobium alcoholate dissolved in a mixture of hydrocarbons (17.3% Nb) | 1.20 |
| Colbalt resinate dissolved in a mixture of hydrocarbons (12.6% Co) | 0.60 |
| Asphalt dissolved in oil of turpentine (30% asphalt) | 1.05 |
| Rosin dissolved in a mixture of essential oils and hydrocarbons (56% rosin) | 1.05 |
| Hexalin | 1.40 |
| Toluene | 0.35 |
| Ethyl acetate | 0.35 |
| | 10.00 |

The resultant solution contained 12% Au, 2.08% Nb and 0.756% Co. It was applied by brushing to a glass-ceramic known at Pyroceram 9608 while this substrate was in the glassy state. The substrate was gradually heated in a kiln to a peak temperature of 1140° C. and was maintained at this temperature for two hours. Upon cooling to room temperature, it was observed that an adherent gold film had formed on the substrate which had been converted to the predominantly crystalline state and was then opaque and white in color. After light burnishing with a glass burnishing brush, the gold film was electrically conductive and had a satiny surface texture of considerable aesthetic appeal.

*Example 2*

A precious metal decorating composition containing both gold and palladium was prepared by mixing together the following ingredients.

| Ingredient: | Parts by weight |
|---|---|
| Palladium resinate dissolved in a mixture of essential oils and hydrocarbons (9% Pd) | 3.30 |
| Gold resinate dissolved in a mixture of essential oils and hydrocarbons (24% Au) | 1.60 |
| Tantalum alcoholate dissolved in a mixture of hydrocarbons (24.6% Ta) | 1.60 |
| Iron resinate dissolved in a mixture of hydrocarbons (11.9% Fe) | 2.00 |
| Silicon resinate dissolved in a mixture of essential oils and hydrocarbons (9.4% Si) | 0.20 |
| Asphalt dissolved in oil of turpentine (30% asphalt) | 0.87 |
| Rosin dissolved in a mixture of essential oils and hydrocarbons (56% rosin) | 0.88 |
| Hexalin | 1.17 |
| Toluene | 0.29 |
| Ethyl acetate | 0.29 |
| | 12.20 |

The resultant solution contained 2.4% Pd, 3.1% Au, 3.2% Ta, 1.9% Fe and 0.15% Si. It was applied by brushing to a glass-ceramic known as Pyroceram 9608 while the substrate was in the glassy state. After firing to a peak temperature of 1140° C., at which it was held for 2 hours, the substrate was converted to an opaque, white, predominantly crystalline glass-ceramic. At the same time the decorating composition formed an adherent, specular, deep gray film having unusual aesthetic appeal.

Example 3

A fired film similar in appearance to that described in Example 2 was obtained from a precious metal decorating composition containing the following ingredients.

| Ingredient: | Parts by weight |
|---|---|
| Gold tertiary dodecyl mercaptide dissolved in heptane (30% Au) | 3.40 |
| Tetra-alkyl titanate (14.2% Ti) | 3.40 |
| Chloroplatinous n-octyl mercaptide—ethyl sulfide complex dissolved in oil of spike (30% Pt) | 0.70 |
| Asphalt dissolved in oil of turpentine (30% asphalt) | 0.63 |
| Rosin dissolved in a mixture of essential oils and hydrocarbons (56% rosin) | 0.63 |
| Hexalin | 0.84 |
| Toluene | 0.20 |
| Ethyl acetate | 0.20 |
| | 10.00 |

The resultant solution contained 10.2% Au, 2.1% Pt and 4.8% Ti. When applied on a glass-ceramic known as Pyroceram 9608, while the substrate was in the glassy state, and after firing on the same cycle used in Example 2, a film similar in appearance to that of Example 2 resulted.

Example 4

A precious metal decorating composition was prepared by mixing together the following ingredients.

| Ingredient: | Parts by weight |
|---|---|
| Gold tertiary dodecyl mercaptide dissolved in heptane (30% Au) | 1.00 |
| Tantalum alcoholate dissolved in a mixture of hydrocarbons (24.6% Ta) | 3.33 |
| Asphalt dissolved in oil of turpentine (30% asphalt) | 1.42 |
| Rosin dissolved in a mixture of essential oils and hydrocarbons (56% rosin) | 1.42 |
| Hexalin | 1.89 |
| Toluene | 0.47 |
| Ethyl acetate | 0.47 |
| | 10.00 |

The resultant solution contained 3.0% Au and 8.2% Ta. It was applied by brushing to a glass-ceramic known as Pyroceram 9608 while the substrate was in the glassy state. After firing to a peak temperature of 1140° C., at which it was held for 2 hours, the substrate was converted to an opaque, white, predominantly crystalline glass-ceramic. At the same time the decorating composition formed an attractive, adherent, highly specular, black film.

Example 5

A precious metal decorating composition was prepared by mixing together the following ingredients.

| Ingredient: | Parts by weight |
|---|---|
| Gold resinate dissolved in a mixture of essential oils (24% Au) | 4.25 |
| Niobium alcoholate dissolved in a mixture of hydrocarbons (17.3% Nb) | 5.0 |
| Asphalt dissolved in oil of turpentine (30% asphalt) | 4.0 |
| Rosin dissolved in oil of turpentine (50% rosin) | 4.0 |
| Oil of rosemary | 2.75 |
| | 20.00 |

The resultant solution contained 5.1% Au and 4.32% Nb. It was applied by brushing to a glass-ceramic known as Pyroceram 9608 while the substrate was in the glassy state. After firing to a peak temperature of 1140° C., at which it was held for 2 hours, the substrate was converted to an opaque, white, predominantly crystalline glass-ceramic. At the same time the decorating composition formed an adherent, highly lustrous, dark gray film of considerable aesthetic appeal.

Example 6

Example 5 was repeated, substituting for the gold resinate solution a 24% Au solution of gold t-dodecyl mercaptide in heptane. When this decorating composition was applied and fired on Pyroceram 9608 as described in Example 5, the fired results were the same in every respect.

Example 7

Example 5 was repeated, substituting for the gold resinate solution a 24% Au solution of gold pinene mercaptide, prepared as described in Example 1 of U.S. Patent No. 2,490,399, in toluene. When this decorating composition was applied and fired on Pyroceram 9608 as described in Example 5, the fired results were the same in every respect.

Example 8

A precious metal decorating composition in a consistency suitable for spraying was prepared by mixing together the following ingredients.

| Ingredient: | Parts by weight |
|---|---|
| Gold t-dodecyl mercaptide dissolved in heptane (30% Au) | 1.7 |
| Niobium alcoholate dissolved in a mixture of hydrocarbons (17.3% Nb) | 2.5 |
| Asphalt dissolved in oil of turpentine (30% asphalt) | 2.0 |
| Rosin dissolved in oil of turpentine (50% rosin) | 2.0 |
| Oil of rosemary | 1.8 |
| Chloroform | 19.8 |
| Oil soluble red dye | 0.2 |
| | 30.0 |

The resultant solution contained 1.7% Au and 1.44% Nb. By means of a hand spray gun, it was applied to a bowl made of a glass-ceramic known as Pyroceram 9608; the bowl was in the glassy state. The bowl was fired to 1120° C., and was held at this temperature for 30 minutes. This heat treatment converted the bowl to an opaque, white material. At the same time the sprayed decoration formed a beautiful, adherent, specular, deep gray-blue film.

Example 9

A precious metal decorating composition in a consistency suitable for stamping, roller coating or screen-printing was prepared by mixing together the following ingredients.

| Ingredient: | Parts by weight |
|---|---|
| Gold resinate dissolved in a mixture of essential oils and hydrocarbons (24% Au) | 8.4 |
| Niobium alcoholate dissolved in a mixture of hydrocarbons (17.3% Nb) | 10.0 |
| Asphalt dissolved in oil of turpentine (30% asphalt) | 10.0 |
| Rosin dissolved in oil of turpentine (50% rosin) | 10.0 |
| Nitrobenzene | 8.3 |
| Oil soluble red dye | 0.3 |
| | 47.0 |

These ingredients were warmed in a casserole on a steam-bath until the net weight had been reduced to 29.4. The thick paste that resulted then contained 6.85% Au and 5.9% Nb. By means of a rubber stamp, this paste was applied in a floral design to a bowl made of a glass-ceramic known as Pyroceram 9608; the bowl was in the glassy state. The bowl was fired to 1120° C., and was held at this temperature for 30 minutes. This heat treatment converted the bowl to an opaque, white material. At the same time the stamped decoration formed a lovely, adherent, iridescent, deep gray-blue film.

The same paste gave a sharp print when applied through a silk screen stencil on to a bowl made of a glass-ceramic known as Pyroceram 9608. Upon ceraming the bowl on the cycle used above, the paste formed a lovely, adherent, iridescent, deep gray-blue film.

*Example 10*

A precious metal decorating composition was prepared by mixing together the following ingredients.

| Ingredient: | Parts by weight |
|---|---|
| Gold tertiary dodecyl mercaptide dissolved in heptane (30% Au) | 6.80 |
| Silicon resinate dissolved in a mixture of essential oils and hydrocarbons (9.4% Si) | 1.50 |
| Asphalt dissolved in oil of turpentine (30% asphalt) | 0.43 |
| Rosin dissolved in a mixture of essential oils and hydrocarbons (56% rosin) | 0.43 |
| Hexalin | 0.56 |
| Toluene | 0.14 |
| Ethyl acetate | 0.14 |
| | 10.00 |

The resultant solution contained 20.4% Au and 1.41% Si. It was applied by brushing to a glass-ceramic known as Pyroceram 9608 while this substrate was in the glassy state. The substrate was heated to 1140° C., and maintained at this temperature for 2 hours. This heat treatment ceramed the substrate, and at the same time the decorating composition formed an adherent, highly specular, electrically conductive, golden bronze film.

*Example 11*

A precious metal decorating composition in a consistency suitable for brushing was prepared by mixing together the following ingredients.

| Ingredient: | Parts by weight |
|---|---|
| Palladium resinate dissolved in a mixture of essential oils and hydrocarbons (9% Pd) | 6.00 |
| Tantalum resinate dissolved in a mixture of hydrocarbons (4.1% Ta) | 36.00 |
| Iron resinate dissolved in a mixture of hydrocarbons (11.9% Fe) | 11.00 |
| Asphalt dissolved in oil of turpentine (30% asphalt) | 1.25 |
| Rosin dissolved in a mixture of essential oils and hydrocarbons (56% rosin) | 3.75 |
| Hexalin | 1.68 |
| Toluene | 0.32 |
| | 60.00 |

The resultant solution contained 0.9% Pd, 2.46% Ta and 2.18% Fe. It was applied by brushing to a glass-ceramic known as Pyroceram 9608 while this substrate was in the glassy state. The substrate was heated to 1140° C., and was maintained at this temperature for 2 hours. This heat treatment converted it to an opaque, white material. At the same time the decorating composition formed an adherent, light gray film having high luster in reflected light.

*Example 12*

A precious metal decorating composition suitable for brushing was prepared by mixing together the following ingredients.

| Ingredient: | Parts by weight |
|---|---|
| Chloroplatinous n-octyl mercaptide–ethyl sulfide complex dissolved in oil of spike (30% Pt) | 3.30 |
| Tantalum alcoholate dissolved in a mixture of hydrocarbons (24.6% Ta) | 1.10 |
| Asphalt dissolved in oil of turpentine (30% asphalt) | 1.40 |
| Rosin dissolved in a mixture of essential oils and hydrocarbons (56% rosin) | 1.40 |
| Hexalin | 1.86 |
| Toluene | 0.47 |
| Ethyl acetate | 0.47 |
| | 10.00 |

The resultant solution contained 9.9% Pt and 2.7% Ta. It was applied by brushing to a glass-ceramic while this substrate was in the glassy state. The substrate was heated to 1140° C., and was maintained at this temperature for 2 hours. This heat treatment converted it to an opaque, white material. At the same time the decorating composition formed an adherent, metallic silvery film. After light burnishing with a glass burnishing brush, this film was electrically conductive.

*Example 13*

A precious metal decorating composition suitable for brushing was prepared by mixing together the following ingredients.

| Ingredient: | Parts by weight |
|---|---|
| Gold resinate dissolved in a mixture of essential oils and hydrocarbons (24% Au) | 4.00 |
| Silicon resinate dissolved in a mixture of essential oils and hydrocarbons (9.4% Si) | 3.00 |
| Tantalum alcoholate dissolved in a mixture of hydrocarbons (24.6% Ta) | 2.00 |
| Asphalt dissolved in oil of turpentine (30% asphalt) | 2.75 |
| Rosin dissolved in a mixture of essential oils and hydrocarbons (56% rosin) | 2.75 |
| Hexalin | 3.66 |
| Toluene | 0.92 |
| Ethyl acetate | 0.92 |
| | 20.00 |

The resultant solution contained 4.8% Au, 1.41% Si and 2.46% Ta. It was brushed on fused silica and fired gradually to 1200° C. The substrate was maintained at this temperature for 30 minutes. Upon cooling, it was observed that the decorating composition had formed an adherent, dense film of red-copper color having a high degree of light reflection.

When applied to a hard-glazed porcelain and fired on the above cycle, the decorating composition gave an adherent, bright, deep red film.

*Example 14*

A precious metal decorating composition suitable for brushing was prepared by mixing together the following ingredients.

| Ingredient: | Parts by weight |
|---|---|
| Gold resinate dissolved in a mixture of essential oils and hydrocarbons (24% Au) | 4.00 |
| Tetra-alkyl titanate (14.2% Ti) | 2.60 |
| Tantalum alcoholate dissolved in a mixture of hydrocarbons (24.6% Ta) | 2.00 |
| Asphalt dissolved in oil of turpentine (30% asphalt) | 2.85 |
| Rosin dissolved in a mixture of essential oils and hydrocarbons (56% rosin) | 2.85 |
| Hexalin | 3.80 |
| Toluene | 0.95 |
| Ethyl acetate | 0.95 |
| | 20.00 |

The resultant solution contained 4.8% Au, 1.85% Ti and 2.46% Ta. It was brushed on fused silica and fired gradually to 1200° C. The substrate was maintained at this temperature for 30 minutes. Upon cooling, it was observed that the decorating composition had formed an adherent, specular, medium green film.

When applied to hard-glazed porcelain and fired to 1350° C., for 30 minutes, the decorating composition gave an adherent, bright olive green film.

Example 15

A precious metal decorating composition suitable for brushing was prepared by mixing together the following ingredients.

| Ingredient: | Parts by weight |
|---|---|
| Gold t-dodecyl mercaptide dissolved in heptane (30% Au) | 2.20 |
| Boron resinate dissolved in a mixture of essential oils and hydrocarbons (1.18% B) | 3.20 |
| Asphalt dissolved in oil of turpentine (30% asphalt) | 1.15 |
| Rosin dissolved in a mixture of essential oils and hydrocarbons (56% rosin) | 1.15 |
| Hexalin | 1.54 |
| Toluene | 0.38 |
| Ethyl acetate | 0.38 |
| | 10.00 |

The resultant solution contained 6.6% Au and 0.38% B. It was applied by brushing to a glass-ceramic known as Pyroceram 9608 while this substrate was in the glassy state. The substrate was heated to 1140° C. and was maintained at this temperature for 2 hours. This heat treatment converted it to an opaque, white material. At the same time the decorating composition formed an adherent, bright purple film having high luster in reflected light.

Example 16

A precious metal decorating composition suitable for brushing was prepared by mixing together the following ingredients.

| Gold t-dodecyl mercaptide dissolved in heptane (30% Au) | 2.00 |
|---|---|
| Lithium resinate dissolved in a mixture of essential oils and hydrocarbons (0.83% Li) | 2.50 |
| Asphalt dissolved in oil of turpentine (30% asphalt) | 1.37 |
| Rosin dissolved in a mixture of essential oils and hydrocarbons (56% rosin) | 1.38 |
| Hexalin | 1.85 |
| Toluene | 0.45 |
| Ethyl acetate | 0.45 |
| | 10.00 |

The resultant solution contained 6.0% Au and 0.21% Li. It was applied by brushing to a glass-ceramic known as Pyroceram 9608 while this substrate was in the glassy state. The substrate was heated to 1140° C. and was maintained at this temperature for 2 hours. This heat treatment converted it to an opaque, white material. At the same time, the decorating composition formed an adherent, bright purple film having high luster in reflected light.

Example 17

A precious metal decorating composition suitable for brushing was prepared by mixing together the following ingredients.

| Ingredient: | Parts by weight |
|---|---|
| Gold t-dodecyl mercaptide dissolved in heptane (30% Au) | 3.40 |
| Nickel resinate dissolved in a mixture of hydrocarbons (9.48% Ni) | 3.20 |
| Asphalt dissolved in oil of turpentine (30% asphalt) | 0.85 |
| Rosin dissolved in a mixture of essential oils and hydrocarbons (56% rosin) | 0.85 |
| Hexalin | 1.14 |
| Toluene | 0.28 |
| Ethyl acetate | 0.28 |
| | 10.00 |

The resultant solution contained 10.2% Au and 3.03% Ni. It was applied by brushing to a glass-ceramic known as Pyroceram 9608 while this substrate was in the glassy state. The substrate was heated to 1140° C. and was maintained at this temperature for 2 hours. This heat treatment converted it to an opaque, white material. At the same time the decorating composition formed an adherent matte gold film. Light burnishing with a glass burnishing brush changed this film to a very attractive bright gold that conducted electricity.

Example 18

A precious metal decorating composition suitable for brushing was prepared by mixing together the following ingredients.

| Ingredient: | Parts by weight |
|---|---|
| Gold t-dodecyl mercaptide dissolved in heptane (30% Au) | 5.10 |
| Vanadium resinate dissolved in a mixture of hydrocarbons (3.92% V) | 1.70 |
| Silicon resinate dissolved in a mixture of essential oils and hydrocarbons (9.4% Si) | 0.20 |
| Asphalt dissolved in oil of turpentine (30% asphalt) | 0.75 |
| Rosin dissolved in a mixture of essential oils and hydrocarbons (56% rosin) | 0.75 |
| Hexalin | 1.00 |
| Toluene | 0.25 |
| Ethyl acetate | 0.25 |
| | 10.00 |

The resultant solution contained 15.3% Au, 0.67% V and 0.19% Si. It was applied by brushing to a glass-ceramic known as Pyroceram 9608 while this substrate was in the glassy state. The substrate was heated to 1140° C. and was maintained at this temperature for 2 hours. This heat treatment converted it to an opaque, white material. At the same time, the decorating composition formed an adherent matte gold film. Light burnishing with a glass burnishing brush changed this film to a very attractive bright gold that conducted electricity.

Example 19

A precious metal decorating composition was prepared by mixing together the following ingredients.

| Ingredient: | Parts by weight |
|---|---|
| Gold t-dodecyl mercaptide dissolved in heptane (30% Au) | 1.60 |
| Uranium resinate dissolved in a mixture of essential oils and hydrocarbons (17.0% U) | 0.50 |
| Tantalum alcoholate dissolved in a mixture of hydrocarbons (24.6% Ta) | 1.00 |
| Asphalt dissolved in oil of turpentine (30% asphalt) | 1.68 |
| Rosin dissolved in a mixture of essential oils and hydrocarbons (56% rosin) | 1.68 |
| Hexalin | 2.36 |
| Toluene | 0.59 |
| Ethyl acetate | 0.59 |
| | 10.00 |

The resultant solution contained 4.8% Au, 0.85% U and 2.46% Ta. It was applied by brushing to a glass-ceramic known as Pyroceram 9608 while this substrate was in the glassy state. The substrate was heated to 1140° C. and was maintained at this temperature for 2 hours. This heat treatment converted it to an opaque, white material. At the same time the decorating composition formed an adherent, highly specular, metallic golden brown film.

*Example 20*

A precious metal decorating composition was prepared by mixing together the following ingredients.

| Ingredient: | Parts by weight |
|---|---|
| Gold t-dodecyl mercaptide dissolved in heptane (30% Au) | 3.40 |
| Tetra-alkyl titanate (14.2% Ti) | 1.70 |
| Asphalt dissolved in oil of turpentine (30% asphalt) | 1.23 |
| Rosin dissolved in a mixture of essential oils and hydrocarbons (56% rosin) | 1.22 |
| Hexalin | 1.63 |
| Toluene | 0.41 |
| Ethyl acetate | 0.41 |
| | 10.00 |

The resultant solution contained 10.2% Au and 2.41% Ti. It was applied by brushing to a glass-ceramic known as Pyroceram 9608 while this substrate was in the glassy state. The substrate was heated to 1140° C. and was maintained at this temperature for 2 hours. This heat treatment converted it to an opaque, white material. At the same time the decorating composition fired to an adherent, gray metallic film. Light burnishing with a glass burnishing brush gave an electrically conductive film with an attractive satiny surface texture.

*Example 21*

A precious metal decorating composition was prepared by mixing together the following ingredients.

| Ingredient: | Parts by weight |
|---|---|
| Gold t-dodecyl mercaptide dissolved in heptane (30% Au) | 3.40 |
| Tetra-alkyl titanate (14.2% Ti) | 3.40 |
| Platinum resinate dissolved in a mixture of essential oils and hydrocarbons (12% pt) | 1.75 |
| Asphalt dissolved in oil of turpentine (30% asphalt) | 0.36 |
| Rosin dissolved in a mixture of essential oils and hydrocarbons (56% rosin) | 0.36 |
| Hexalin | 0.49 |
| Toluene | 0.12 |
| Ethyl acetate | 0.12 |
| | 10.00 |

The resultant solution contained 10.2% Au, 2.1% Pt and 4.83% Ti. It was applied by brushing to a glass-ceramic while this substrate was in the glassy state. The substrate was heated to 1120° C. and was maintained at this temperature for 4 hours. This heat treatment converted it to an opaque, white material. At the same time the decorating composition formed an adherent, highly specular, metallic deep gray film of considerable aesthetic appeal.

*Example 22*

A precious metal decorating composition was prepared by mixing together the following ingredients.

| Ingredient: | Parts by weight |
|---|---|
| Dichlorobisdi-n-butylsulfidepalladium (II) dissolved in toluene (20% Pd) | 1.35 |
| Tantalum pentachloride dissolved in a mixture of toluene and oil of rosemary (7.79% Ta) | 9.47 |
| Iron resinate dissolved in a mixture of hydrocarbons (11.9% Fe) | 5.50 |
| Asphalt dissolved in oil of turpentine (30% asphalt) | 3.42 |
| Rosin dissolved in a mixture of essential oils and hydrocarbons (56% rosin) | 3.42 |
| Hexaline | 4.56 |
| Toluene | 1.14 |
| Ethyl acetate | 1.14 |
| | 30.00 |

The resultant solution contained 0.9% Pd, 2.46% Ta and 2.18% Fe. It was applied by brushing to a glass-ceramic while this substrate was in the glassy state. The substrate was fired to 1120° C. and was maintained at this temperature for 4 hours. This heat treatment converted it to an opaque, white material. At the same time the decorating composition formed an adherent, deep gray film of considerable aesthetic appeal.

It will be obvious to those skilled in the art that many modifications may be made within the scope of the present invention without departing from the spirit thereof, and the invention includes all such modifications.

What is claimed is:

1. A method of producing a precious metal-decorated glass-ceramic article comprising applying to an unceramed ceramable glass article destined to be ceramed a precious metal decorating composition comprising an organic precious metal compound, a fluxing agent for the precious metal, and an organic vehicle for the precious metal compound and fluxing agent, the decorating composition containing about 0.25–10 moles of fluxing elements per mole of precious metal, heating the resulting article to a ceraming temperature not in excess of 1350° C., and maintaining the article at the ceraming temperature for a time sufficient to ceram the article thereby obtaining a glass-ceramic article having a precious metal film deposited thereon.

2. A method of producing a precious metal decorated glass-ceramic article comprising applying to an unceramed ceramable glass article destined to be ceramed a gold decorating composition comprising a soluble organic gold compound, a fluxing agent for the gold, and an organic vehicle for the gold compound and fluxing agent, the composition containing about 0.25–10 moles of fluxing elements per mole of gold, heating the resulting article to a ceraming temperature not in excess of 1350° C., and maintaining the article at the ceraming temperature for a time sufficient to ceram the article thereby obtaining a glass-ceramic article having a metallic gold film deposited thereon.

3. A method of producing a platinum-decorated glass-ceramic article comprising applying to an unceramed ceramable glass article destined to be ceramed a platinum decorating composition comprising a soluble organic platinum compound, a fluxing agent for the platinum, and an organic vehicle for the organic platinum compound and fluxing agent, the composition containing about 0.25–10 moles of fluxing elements per mole of platinum, heating the resulting article to a ceraming temperature not in excess of 1350° C., and maintaining the article at the ceraming temperature for a time sufficient to ceram the article thereby obtaining a glass-ceramic article having a metallic platinum film deposited thereon.

4. A method of producing a palladium-decorated glass-ceramic article comprising applying to an unceramed ceramable glass article destined to be ceramed a palladium decorating composition comprising a soluble organic palladium compound, a fluxing agent for the palladium, and an organic vehicle for the palladium compound and the fluxing agent, the composition containing about 0.25–10 moles of fluxing elements per mole of palladium, heating the resulting article to a ceraming temperature not in excess of 1350° C., and maintaining the article at the ceraming temperature for a time sufficient to ceram said article thereby obtaining a glass-ceramic article having a metallic palladium film deposited thereon.

5. A method of producing a precious metal-decorated glass-ceramic article comprising applying to an unceramed ceramable glass article destined to be ceramed a precious metal decorating composition comprising an organic precious metal compound, a soluble compound of tantalum as a flux for the precious metal, and an organic vehicle for the precious metal compound and flux, heating the resulting article to a ceraming temperature within the range of 900° C. to 1350° C., and maintaining the article at the ceraming temperature for a time sufficient to ceram the article thereby obtaining a glass-ceramic article having a precious metal film deposited thereon.

6. A method of producing a precious metal-decorated glass-ceramic article comprising applying to an unceramed ceramable glass article destined to be ceramed a precious metal decorating composition comprising an organic precious metal compound, a soluble compound of niobium as a flux for the precious metal, and an organic vehicle for the precious metal compound and flux, heating the resulting article to a ceraming temperature within the range of 900° C. to 1350° C., and maintaining the article at the ceraming temperature for a time sufficient to ceram the article thereby obtaining a glass-ceramic article having a precious metal film deposited thereon.

7. A method of producing a precious metal-decorated glass-ceramic article comprising applying to an unceramed ceramable glass article destined to be ceramed a precious metal decorating composition comprising an organic precious metal compound, a fluxing agent for the precious metal decorating composition comprising an organic precious metal compound, a soluable compound of niobium as a flux for the precious metal, and an organic vehicle for the precious metal compound and flux, heating the resulting article to a ceraming temperature within the range of 900° C. to 1350° C., and maintaining the article at the ceraming temperature for a time sufficient to ceram the article thereby obtaining a glass-ceramic article having a precious metal film deposited thereon.

8. A method of producing a precious metal-decorated glass-ceramic article comprising applying to an unceramed ceramable glass article destined to be ceramed a precious metal decorating composition comprising a soluble organic precious metal compound, a fluxing agent for the precious metal, and an organic vehicle for the precious metal compound and fluxing agent, the composition containing from 0.5–3 moles of fluxing elements per mole of precious metal, heating the resulting article to a ceraming temperature within the range of 900° C. to 1350° C., and maintaining the article at the ceraming temperature for a time sufficient to ceram the article thereby obtaining a glass-ceramic article having a precious metal film deposited thereon.

References Cited by the Examiner

UNITED STATES PATENTS

| | | | |
|---|---|---|---|
| 1,954,353 | 4/1934 | Ernst | 106—1 |
| 2,490,399 | 12/1949 | Ballard | 106—1 |
| 2,733,167 | 1/1956 | Stookey | 106—1 |
| 2,842,457 | 7/1958 | Morgan et al. | 106—1 |
| 3,105,772 | 10/1963 | Loiseleur | 106—1 |

ALEXANDER H. BRODMERKEL, *Primary Examiner.*

JOSEPH REBOLD, MORRIS LIEBMAN, *Examiners.*

J. POER, J. E. CARSON, D. J. ARNOLD,
*Assistant Examiners.*

UNITED STATES PATENT OFFICE
CERTIFICATE OF CORRECTION

Patent No. 3,266,912                                August 16, 1966

Peter J. Murphy

It is hereby certified that error appears in the above numbered patent requiring correction and that the said Letters Patent should read as corrected below.

Column 18, line 6, beginning with "decorating" strike out all to and including "and flux," in line 9, and insert instead -- , and an organic vehicle for the precious metal compound and fluxing agent, the composition containing about 0.25-10 moles of fluxing elements per mole of precious metal, --.

Signed and sealed this 1st day of August 1967.

(SEAL)
Attest:

EDWARD M. FLETCHER, JR.                          EDWARD J. BRENNER
Attesting Officer                                Commissioner of Patents